(12) United States Patent
Worthington

(10) Patent No.: US 11,691,230 B1
(45) Date of Patent: Jul. 4, 2023

(54) TOOL HOLDER WITH STRESS FIT RODS

(71) Applicant: Techniks, LLC, Indianapolis, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/902,166

(22) Filed: Sep. 2, 2022

Related U.S. Application Data

(62) Division of application No. 17/716,541, filed on Apr. 8, 2022, now Pat. No. 11,465,216.

(60) Provisional application No. 63/179,644, filed on Apr. 26, 2021.

(51) Int. Cl.
*B23P 11/02* (2006.01)
*B23P 15/00* (2006.01)
*B23B 31/117* (2006.01)

(52) U.S. Cl.
CPC ............. *B23P 15/00* (2013.01); *B23P 11/025* (2013.01); *B23B 31/1179* (2013.01)

(58) Field of Classification Search
CPC .... B23P 11/025; B23P 11/027; B23B 31/1179
See application file for complete search history.

(56) References Cited

U.S. PATENT DOCUMENTS

| | | | | |
|---|---|---|---|---|
| 5,311,654 A | * | 5/1994 | Cook | B23B 31/1179 279/20 |
| 5,941,647 A | | 8/1999 | Koike et al. | |
| 6,260,858 B1 | * | 7/2001 | DeLucia | B23P 11/027 409/234 |
| 6,666,461 B1 | | 12/2003 | Retzbach | |
| 7,182,558 B2 | * | 2/2007 | Haimer | B23B 31/1179 409/234 |
| 7,325,471 B2 | | 2/2008 | Massa et al. | |
| 9,248,508 B2 | | 2/2016 | Motschi et al. | |
| 2017/0173704 A1 | | 6/2017 | Popp et al. | |
| 2022/0362862 A1 | * | 11/2022 | Worthington | B23B 31/223 |

FOREIGN PATENT DOCUMENTS

| | | |
|---|---|---|
| DE | 262006000640 U1 | 3/2006 |
| WO | 0059660 A1 | 10/2000 |

OTHER PUBLICATIONS

Gere et al., Mechanics of Materials, Fourth Edition, p. 891, PWS Publishing Company, 1997.

* cited by examiner

*Primary Examiner* — Nirvana Deonauth
(74) *Attorney, Agent, or Firm* — Shuttleworth & Ingersoll, PLC; Jason Sytsma

(57) ABSTRACT

A tool holding section opposite the first section with a bore formed in the tool holding section adapted for receiving the shank of the tool. A plurality of stress rods positioned around the bore and comprising a thermal rate of expansion less than a thermal rate of expansion of the tool holding section. The plurality of stress rods form corresponding bulges on the surface of the bore to decrease the inner diameter of the bore to mechanically lock the shank of the tool in the bore.

12 Claims, 5 Drawing Sheets

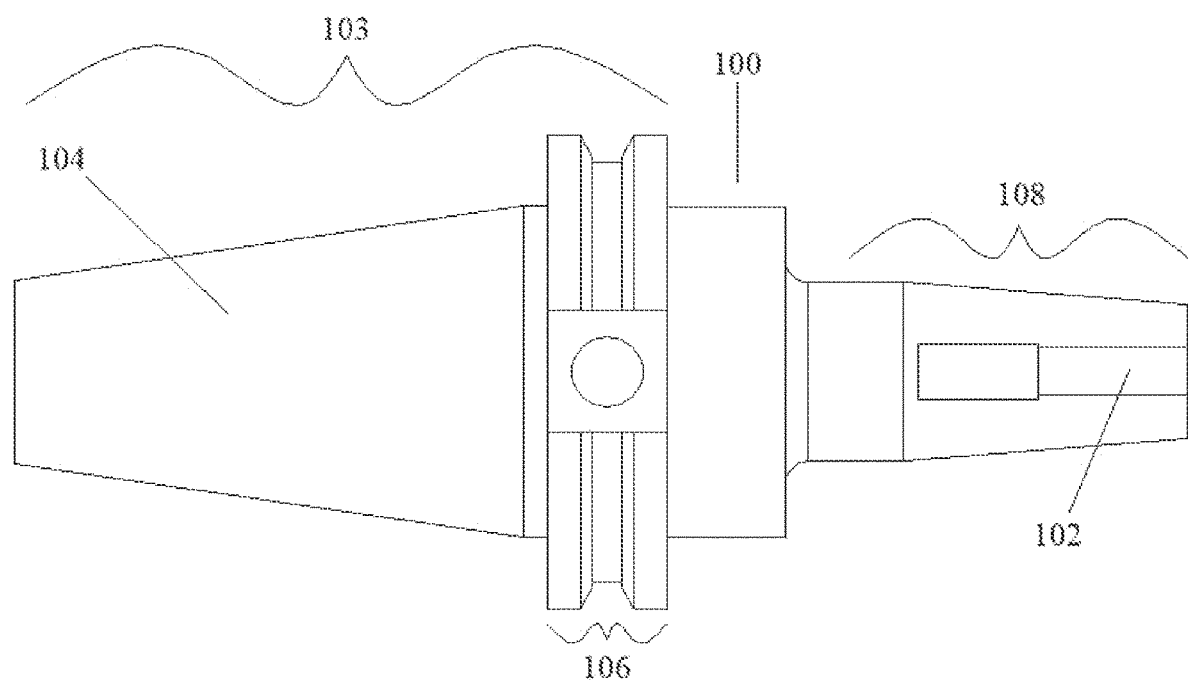

TOOL HOLDER WITH STRESS FIT RODS

CROSS-REFERENCE TO RELATED APPLICATIONS

This application claims the benefit of U.S. patent application Ser. No. 17/716,541 filed Apr. 8, 2022 and Provisional Patent Application No. 63/179,644 filed Apr. 26, 2021. The entirety of both applications are incorporated by reference herein.

TECHNICAL FIELD

This disclosure relates to a shrink-fit tool holder, and more specifically, this disclosure relates to a method and apparatus for retaining a tool in a shrink-fit tool holder by embedding stress fit rods around the circumference of the bore of the tool holder to mechanically lock the tool to the tool holder.

BACKGROUND INFORMATION

A machining center is a computer numerical control (CNC) machining tool with an automatic tool-changing function. The machining center can automatically perform various working such as milling, drilling or notching, boring, tapping, etc. on works set thereto with improved efficiency. A tool holder comprises generally of a tapered portion adapted to be connected to a spindle of a machining center, a manipulator-engaging portion, and a tool holding section for firmly holding the tool.

One type of tool holder is a shrink-fit tool holder, which can firmly hold a tool with excellent dynamic balancing suitable for high-speed work. The shrink-fit tool holder comprises of a tapered connecting portion, a manipulator-engaging portion, and a tool holding section for firmly holding a tool. A shank of the tool is inserted into an aperture of the tool holding section and secured by shrinkage fitting.

The conventional shrink-fit tool holders utilize differences in thermal expansion coefficients between the tool-holding sections and the tool shanks. The tool shanks are made of materials having low thermal expansion coefficients such as sintered carbides, high speed steel, etc., while the tool-holding sections are made of high-expansion materials such as hot work tool steel, nickel-chromium steel, etc.

In these prior art tool holders, the tool shank and the aperture of the tool-holding sections have suitably controlled sizes to achieve detachability, thereby minimizing the heating for shrinkage fitting and thus preventing decrease in strength and hardness of materials due to change in their structures. However, in the conventional shrinkage-fit tool holders, the difference in a thermal expansion coefficient between the tool-holding member and the tool shank is insufficient, thereby creating opportunities for a failure to achieve a sufficient gripping strength or a failure to extract the tool.

Accordingly, there is a need for a method and apparatus for retaining a tool in a shrink-fit tool holder.

SUMMARY

Disclosed is a tool holder for holding a tool having a shank with an outer diameter. The tool holder comprises of a first section adapted to be connected to a machining center; a tool holding section opposite the first section; a bore formed in the tool holding section adapted for receiving the shank of the tool; a surface of the bore defining an inner diameter of the bore; a plurality of stress rods positioned around the bore and comprising a thermal rate of expansion less than a thermal rate of expansion of the tool holding section, wherein the plurality of stress rods form corresponding bulges on the surface of the bore to decrease the inner diameter of the bore to mechanically lock the shank of the tool in the bore.

In an embodiment, the tool holding section has a front face perpendicular to a longitudinal length of the tool holding section. The bore is formed in the front face of the tool holding section and the plurality of stress rods are positioned around the bore in the holes with the plurality of stress rods being flush with the face of the tool holding section. In some embodiments, each of the plurality of stress rods can comprise two or more stress rods stacked on top of each other in the hole.

In an embodiment, the stress rods are fixed in the tool holding section of the tool holder and cause elastic deformation of the surface of the bore. A plurality of holes can be positioned around the bore and configured for receiving the plurality of stress rods. The plurality of stress rods can comprise a diameter larger than a diameter of the plurality of holes. The plurality of stress rods can be placed in the corresponding plurality of holes by changing the relative temperature of the plurality of stress rods and the tool holding section. In an embodiment, the plurality of stress rods are cooled to decrease the diameter of the plurality of stress rods for inserting the plurality of stress rods in the corresponding plurality of holes in the tool holding section. In another embodiment, the tool holding section is heated to increase the diameter of the plurality of holes of the tool holding section for inserting the corresponding plurality of stress rods in the holes of the tooling holding section. In yet another embodiment, the plurality of stress rods are placed in the corresponding plurality of holes by pressing the corresponding plurality of stress rods therein.

The plurality of stress rods can comprise a durable material with a lower thermal rate of expansion than material comprising the tool holder. In one embodiment, the stress rods comprise a ceramic material.

In another embodiment, a method for creating a tool holder for receiving a shank of a tool is disclosed. The method comprises forming a face in a tool holding section that is perpendicular to the longitudinal length of the tool holding section; forming a bore in the face of the tool holding section; forming a plurality of circumferentially spaced holes around the bore; and inserting into each of the plurality of circumferentially spaced holes around the bore a stress rod or at least two stress rods on top of each other.

In an embodiment, the method comprises of changing the relative diameter of the plurality of circumferentially to the stress rods by heating the tool holding section or cooling the stress rods. Afterwards, the method continues by allowing the relative diameter of the plurality of circumferentially to the stress rods to equalize forming bulges in the bore of the tool holding section. Thereafter, the method continues by heating the tool holding section to expand the bore to receive the shank of the tool.

BRIEF DESCRIPTION OF THE DRAWINGS

These and other features and advantages of the present invention will be better understood by reading the following detailed description, taken together with the drawings wherein:

FIG. 1 is a partial cross-sectional side view of a tool holder with a shrink-fit bore according to the prior art.

DETAILED DESCRIPTION OF THE PREFERRED EMBODIMENTS

Figure 2A:
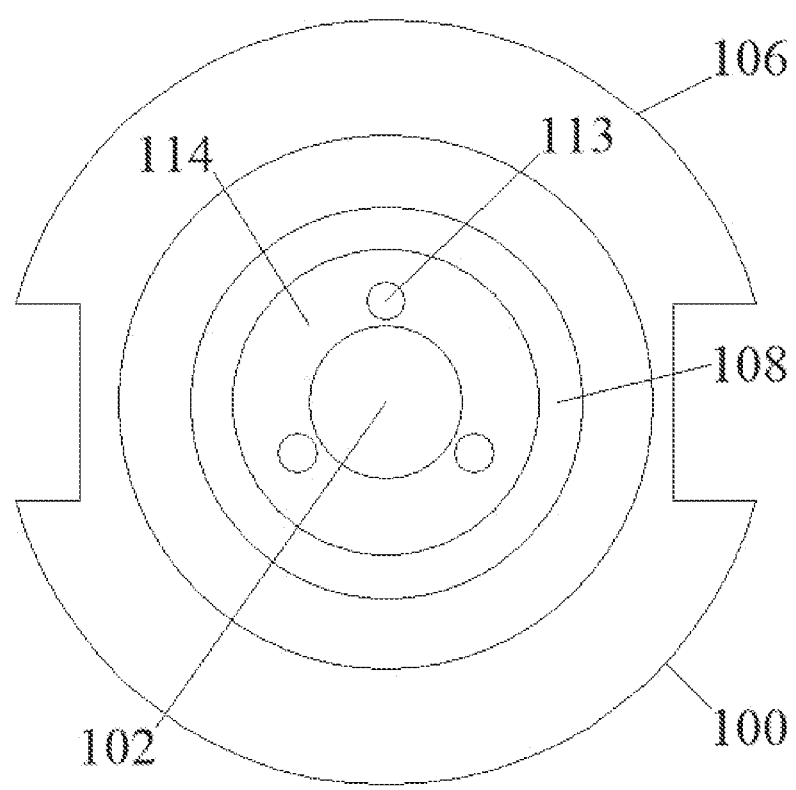
FIG. 2A is a top view of a tool holder with a shrink-fit bore showing the face of the tool holder drilled with a plurality of circumferentially placed holes around the bore.

Referring to FIG. 1, disclosed is a tool holder 100 with a bore 102 that can be shrink-fit onto a tool according to the prior art. Tool holder 100 comprises of a first section 103 adapted to be connected to a machining center (CNC). This first section 103 can include a tapered connecting portion 104 configured to be received by a CNC machine (not shown) and a manipulator-engaging portion 106 is designed to be engaged by a clamping system in the CNC machine to hold firmly tool holder 100 to the CNC machine spindle. A tool holding section 108 can firmly hold a tool 110 (shown in FIG. 3) to the tool holder 100. A shank of the tool is inserted into bore 102 of tool holding section 108 and secured by shrink fitting.

This disclosure is directed to increase the coefficient of static friction between tool holder 100 and tool 110. The grip of the tool holder 100 is improved by inserting into bore 102 of tool holding section 108 a plurality of circumferentially placed stress rods 112 to provide a mechanical lock of the shank of tool 110 by bore 102. For the purpose of this disclosure, stress rods 112 can comprise any material with a lower rate of thermal expansion than the material of tool holding section 108. Such materials, include comprise cemented carbides, like tungsten carbide (WC; referred to as "carbide" in connection with machine tooling), titanium carbide, tantalum carbide, metals like tungsten, titanium, tantalum, vanadium, ceramic, and ceramic materials such as silicon nitride ceramic. For the purpose of this disclosure, a lower rate of thermal expansion refers to a temperature differential between stress rods 112 and tool holding section 108 necessary to cause the relative surface areas between the two to increase. This temperature differential can come from heating tool holding section 108 or cooling stress rods 112. The importance is being able to insert stress rods 112 into holes 113 in a face 114 of tool holding section 108 and fix them in place when the temperature differential between the two returns to the typical insertion/extraction temperature.

Figure 2B:
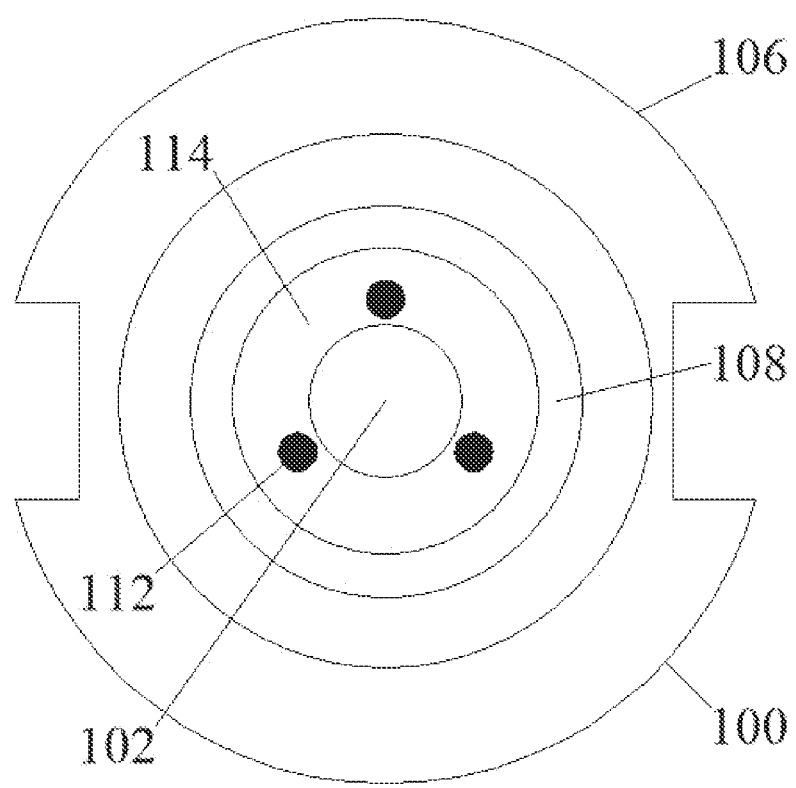
FIG. 2B is a top view of the tool holder of FIG. 2A with stress rods inserted into the circumferentially placed holes and the tool holder heated for insertion or extraction of a tool.
Figure 2C:
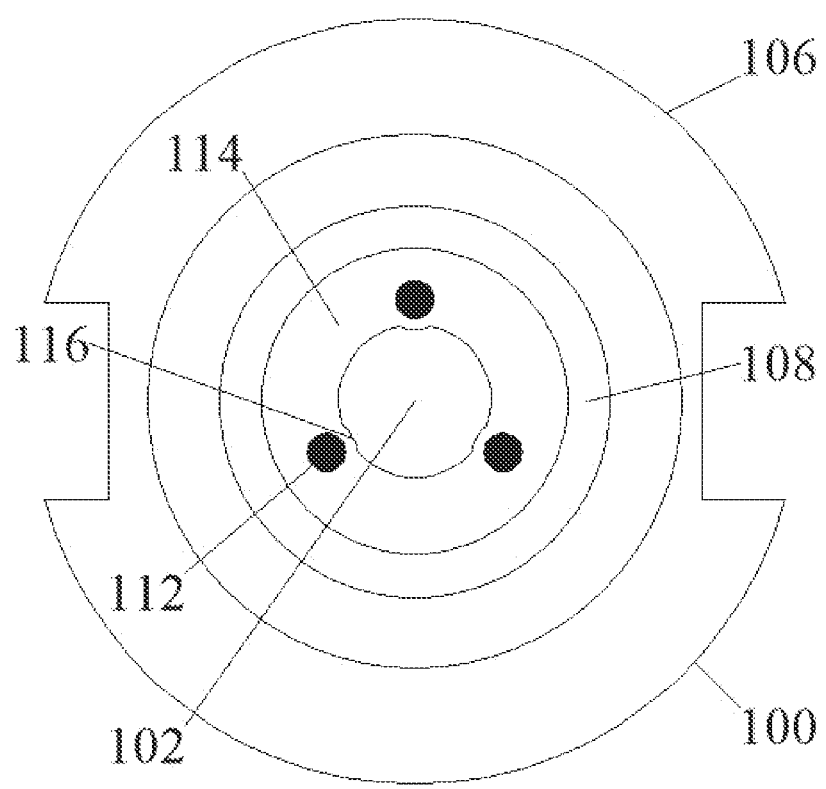
FIG. 2C is a top view of the tool holder of FIG. 2B after the tool holder has cooled for use.

In an embodiment, with reference of FIG. 2A, a plurality of circumferentially placed holes 113 are drilled in into face 114 of tool holding section 108 around bore 102 of tool holder 100. Thereafter, either tool holding section 108 is heated to a temperature sufficient to increase the diameter of holes 113 in order for each of holes 113 to receive a corresponding stress rod 112 and/or stress rods 112 are cooled to decrease their diameter, as shown in FIG. 2B. Once the relative temperature between tool holding section 108 and stress rods 112 returns to ambient temperature, as shown in FIG. 2C, bore 102 has a bulge 116 corresponding to the location of stress rod 112, which reduces the apparent bore diameter. When tool 110 is inserted into bore 102 (typically by reheating tool holding section 108) and tool holding section 108 returns to its ambient temperature, each bulge 116 from stress rod 112 presses against tool 110 to lock it in place, as shown it FIG. 3.

More specifically, the temperature differential between tool holding section 108 of tool holder 100 and stress rods 112 is changed to a sufficient degree to either expand holes 113 around bore 102 or shrink the diameter of stress rods 112. The temperature differential need only be sufficient for holes 113 to receive stress rods 112. Thereafter, the temperature differential between tool holding section 108 and stress rods 112 is allowed to return to ambient temperature. This fixes stress rods 112 in bore 102 by either allowing the inner diameter of holes 113 of tool holder 100 to attempt to return to their initial diameter when a tool 110 is inserted in bore 102 or allowing stress rods 112 to return to their normal diameter, which in either case mechanically locks tool 110 to bore 102 of tool holder 100 due to the pressure between bulges 116 around surface of bore 102 and tool 110. By heating tool holding section 108 of tool holder 100 or cooling stress rods 112, less force is required to place stress rods 112 into holes 113; however, other ways for placing stress rods 112 into holes 113 will be discussed below.

Stress rods 112 are circumferentially spaced around bore 102 to keep the center of mass for the rotating tool holder 100 along its axis that extends through the center of bore 102. While it is possible to have unequal distribution of stress rods 112 around bore 102, wobbling will occur unless the weight of stress rods 112 are offset with additional weights. For this reason, three (3) stress rods 112 circumferentially placed one-hundred and twenty degrees (120°) apart may be an optimal distribution of stress rods 112; however, any number of a plurality of stress rods 112 evenly divisible by three-hundred and sixty can be placed in tool holding section 108; for example 2, 3, 4, 5, 6, 8, etc. Increasing the number of stress rods beyond 3 does not increase the usable bore diameter. Rather, it only provides more points of contact between the bore 102 and the tool 110. Furthermore, instead of a single stress rod 112 per hole 113, two or more stress rods 112 can be stacked on top of each other in each hole 113. Multiple stress rods 112 per hole 113 allows the material of tool holding section 108 to expand in length when heated without forcing the material to slip past stress rods 112, because repeated heating and cooling cycles might cause longer rods to work their way out of the holes.

Stress rods 112 can be any diameter depending on the size of tool holding section 108 or bore 102 of tool holder 100. The diameter of stress rods 112 should be small enough so that corresponding hole 113 when placed around bore 102 does not structurally degrade tool holding section 108. This can occur, for example, if the distance between stress rod 112 and the outer diameter of tool holding section 108 is too small. Furthermore, if bulge 116 in bore 102 is too large the side wall area between bore 102 and stress rod 112 could be too thin causing a degradation of tool holding section 108. The end result is an apparent reduction of diameter of bore 102 that locks tool 110 to tool holding section 108. Stress rods 112 can also be any shape.

Stress rods 112 can be inserted into tool holding section 108 of tool holder 100 in a number of different manners. The goal is to change the relative diameter of stress rods 112 to holes 113 in face 114 of tool holding section 108. This can be done, for example, by extreme cooling of stress rods 112 (for example by immersion in dry ice) or by extreme heating of tool holding section 108. In either case, as the relative diameter of stress rods 112 to holes 113 in face 114 of tool holding section 108 returns to normal, bulges 116 around bore 102 form. Stress rods 112 can also be embedded into holes 113 with extreme force by pressing stress rods 112 into holes 113.

Figure 3:
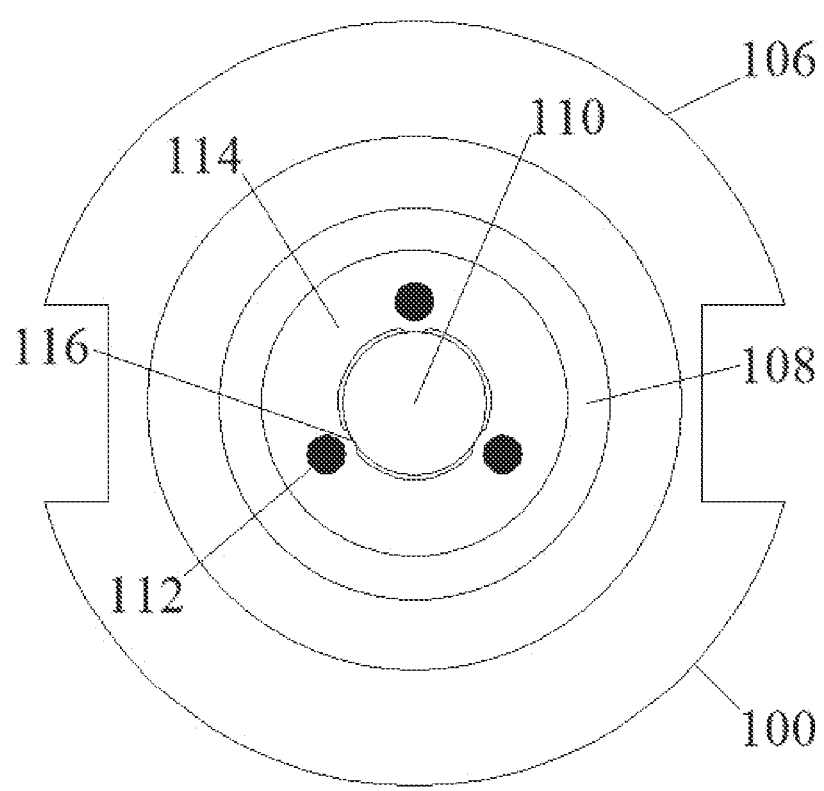
FIG. 3 is a top view of the tool holder of FIG. 2C with a tool in the tool holder.

FIG. 3 shows tool holder 100 with a tool 110 mechanically locked in bore 102 of tool holding section 108. As shown, stress rods 112 create corresponding bulges 116 in surface of bore 102. After tool holding section 108 has cooled and the inner diameter of bore 102 has shrunk, a mechanical lock occurs between stress rods 112 and tool 110.

One skilled in the art will know that with respect to shrink fit tool holders H13 (SKD61) is the most common metal used for production, although stainless steel is also commonly used. Shrink fit tool holders made from any metals with similar characteristics, however, will benefit from the addition of stress rods 112 fixed into tool holding section 108.

Stress rods 112 embedded in tool holding section 108 provide more expansion with the same amount of heat as standard shrink fit tool holder. This has the advantage of allowing bore 102 to have a wider range of tolerances without sacrificing gripping strength. In fact, the rigidity of bore 102 is increased. This means a wider range of high-speed steel (HSS) tools can be used with tool holder 100. When tool holder 100 is in use, the resonant frequencies from its operation are spread out which decreases chattering.

Another advantage is that a portion of material in tool holding section 108 is removed from forming holes 113. This less material means that less heat is required to insert and remove tools 110 from tool holding section 108. Similarly, tool holding section 108 will cool faster.

It should also be noted that when tool 110 is difficult to extract from bore 102, operators tend to overheat tool holder 100 to try to increase the expansion of bore 102. This can cause permanent damage to tool holder 100. Stress rods 112 will reduce the number of tool holders damaged by overheating, by providing improved extractability.

The methods for creating a tool holder is also disclosed. The method begins at step 202 and proceeds to step 204 by forming in face 114 of tool holding section 108 a plurality of circumferentially spaced holes 113 around bore 102. At step 206 the relative diameter of holes 113 to stress rods 112 is temporarily changed. This can occur by heating of tool holding section 108 or cooling stress rods 112. The method continues at step 208 by inserting stress rods 112 into holes 113. The method continues at step 210 by fixing stress rods 112 in corresponding holes 113 by allowing the relative diameter of holes 113 to stress rods 112 to equalize and return to normal. This causes bulges 116 to form in bore 102 of tool holding section 108.

The method can continue at step 212 by heating tool holding section 108 so that tool holding section 108 including bore 102 expands which causes bulges 116 to temporarily disappear and bore 102 to temporarily return to a round shape. Bulges 116 disappear as the heat increases, which increases the apparent diameter of bore 102. Once the bore is round, increasing the heat will increase the bore diameter at the same rate as standard shrink fit. Tool 110 can then be inserted into bore 102. At step 214 tool holder is allowed to cool and return to its ambient state with a smaller diameter bore 102 and bulges 116 mechanically locking tool 110 into bore 102. Step 212 can be repeated when it comes time to remove tool 110 from bore 102.

Those skilled in the art will recognize that the implementations described herein have lots of variables that change the temperature differential required to insert stress rods 112 into holes 113. These variables include the bore diameter where larger bores have larger surface areas and will require more heat to expand holes 113. Bores that have a longer length have a larger surface area and will require longer stress rods 112 which in turn requires a greater temperature differential for placement of stress rods 112 into holes 113.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A method for creating a tool holder for receiving a shank of a tool, the method comprising:
   forming a face in a tool holding section that is perpendicular to a longitudinal length of the tool holding section;
   forming a bore in the face of the tool holding section;
   forming a plurality of circumferentially spaced holes around the bore extending from the face and downward parallel with the bore; and
   inserting into each of the plurality of circumferentially spaced holes around the bore a corresponding one of a plurality of stress rods;
   changing a relative diameter of the plurality of circumferentially spaced holes to the corresponding one of the plurality of stress rods;
   allowing the relative diameter of the plurality of circumferentially spaced holes to the corresponding one of the plurality of stress rods to equalize forming bulges in the bore of the tool holding section.

2. The method for creating a tool holder of claim 1, wherein changing the relative diameter of the plurality of circumferentially spaced holes to the corresponding one of the plurality of stress rods further comprises heating the tool holding section.

3. The method for creating a tool holder of claim 1, wherein changing the relative diameter of the plurality of circumferentially spaced holes to the corresponding one of the plurality of stress rods further comprises cooling the stress rods.

4. A method for creating a tool holder for receiving a shank of a tool, the method comprising:
   forming a face in a tool holding section that is perpendicular to a longitudinal length of the tool holding section;
   forming a bore in the face of the tool holding section;
   forming a plurality of circumferentially spaced holes around the bore; and
   inserting into each of the plurality of circumferentially spaced holes around the bore a corresponding one of a plurality of stress rods;
changing a relative diameter of the plurality of circumferentially to the stress rods; and
allowing the relative diameter of the plurality of circumferentially spaced holes to the corresponding one of the plurality of stress rods to equalize forming bulges in the bore of the tool holding section.

5. The method for creating a tool holder of claim 4, further comprising heating the tool holding section to expand the bore to receive the shank of the tool.

6. The method for creating a tool holder of claim 1, further comprising inserting into each of the plurality of circumferentially spaced holes around the bore at least two stress rods of the plurality of stress rods.

7. The method for creating a tool holder of claim 1, wherein each of the plurality of stress rods comprises a diameter larger than an original diameter of the corresponding hole of the plurality of circumferentially spaced holes around the bore.

8. The method for creating a tool holder of claim 1, further comprising fixing the plurality of stress rods in the corresponding plurality of circumferentially spaced holes around the bore.

9. A method for creating a tool holder for receiving a shank of a tool, the method comprising:
- forming a face in a tool holding section that is perpendicular to a longitudinal length of the tool holding section;
- forming a bore in the face of the tool holding section;
- forming a plurality of circumferentially spaced holes around the bore;
- inserting into each of the plurality of circumferentially spaced holes around the bore at least one stress rod of a plurality of stress rods;
- allowing the relative diameter of the plurality of circumferentially spaced holes to a corresponding one of the plurality of stress rods to equalize forming bulges in the bore of the tool holding section; and
- fixing the plurality of stress rods in the corresponding plurality of circumferentially spaced holes around the bore;
- wherein the step of fixing the plurality of stress rods in the corresponding plurality of circumferentially spaced holes around the bore further comprises changing a relative diameter of the plurality of circumferentially spaced holes to the corresponding one of the plurality of stress rods by heating the tool holding section and cooling the stress rods.

10. The method for creating a tool holder of claim 9, wherein the heating the tool holding section expands the bore to receive the shank of the tool.

11. The method for creating a tool holder of claim 9, further comprising inserting into each of the plurality of circumferentially spaced holes around the bore at least two stress rods of the plurality of stress rods.

12. The method for creating a tool holder of claim 9, wherein each of the plurality of stress rods comprises a diameter larger than an original diameter of the corresponding plurality of circumferentially spaced holes around the bore.

\* \* \* \* \*